UNITED STATES PATENT OFFICE.

ALBERT SAUER, OF WARSAW, RUSSIA, ASSIGNOR TO DEUTSCHE CONTINENTAL GAS GESELLSCHAFT, OF DESSAU, GERMANY, A FIRM.

PROCESS OF OBTAINING PRUSSIAN BLUE.

SPECIFICATION forming part of Letters Patent No. 712,726, dated November 4, 1902.

Application filed June 20, 1901. Serial No. 65,336. (No specimens.)

*To all whom it may concern:*

Be it known that I, ALBERT SAUER, a subject of the Emperor of Germany, and a resident of 8 Senatorska, Warsaw, Russia, have invented certain new and useful Improvements in the Process of Obtaining Prussian Blue, of which the following is a specification.

In carrying out the process described in the specification of Letters Patent No. 625,964, of the 30th May, 1899, a mud is obtained which consists, essentially, of an insoluble double salt of ammonium ferrocyanid, a little iron sulfid, a solution of ammonium sulfate, ammonium carbonate, and ammonium sulfid, the said mud being a raw material from which various marketable cyanogen compounds are obtainable. Hitherto Prussian blue has been obtained from this mud by isolating the double salt and converting it into a soluble ferrocyanid by means of alkalies or alkaline earths, this ferrocyanid being afterward converted into Prussian blue by the addition of a ferric salt with or without the addition of ammonia, or in lieu of a ferric salt a ferrous salt has been used when the leuco compound Prussian white is first obtained, which by oxidation is converted into Prussian blue. I have found that the said leuco compound Prussian white exists in the aforesaid mud and that to isolate it it is only necessary to remove the ammoniacal compounds and the iron sulfid which may still be present. This is effected by boiling for a rather long time the said mud, so that volatile ammoniacal compounds escape. After the boiling operation the mud consists of the aforesaid leuco compound (Prussian white) and of a solution of ammonium sulfate, which is removed by pressure after any iron sulfid that may still be present in the residue of the boiling operation has been rendered soluble, which may be done by the addition of sulfuric acid.

The boiling operation may be dispensed with by adding first to the mud residue as much concentrated sulfuric acid as will neutralize it, this operation transforming the volatile ammonium compounds also into ammonium sulfate, while sulfureted hydrogen and carbon dioxid are evolved, so that after the isolation of the Prussian white a concentrated solution of ammonium sulfate remains as residue. The isolated Prussian white is then oxidized to Prussian blue, which may be effected in the well-known manner—that is to say, by stirring the solid mass to be oxidized to a homogeneous mud and adding to this while heating a clear solution of chlorid of lime until the oxidation of the Prussian white to Prussian blue is completed. Instead of chlorid of lime nitric acid or chlorid of iron may be used. The oxidized mass is pressed through a filtering-press and the remaining cake of Prussian blue is washed.

I claim—

1. The herein-described process of obtaining Prussian blue from the mud obtained by treating raw illuminating-gas with a liquid that contains an iron compound, which process consists in boiling the mud, thus removing the volatile ammonia compounds, then treating the residue with sulfuric acid, thus converting the iron sulfid into a soluble form, then filtering the mass, thus removing the sulfate of ammonia.

2. The herein-described process of obtaining Prussian blue from the mud obtained by treating raw illuminating-gas with a liquid that contains an iron compound, which process consists in boiling the mud, thus removing the volatile ammonia compounds, then treating the residue with sulfuric acid, thus converting the iron sulfid into soluble form, then filtering the mass, thus removing the sulfate of ammonia and treating the remaining solid mass with an oxidizing agent.

In testimony whereof I have signed my name to this specification in the presence of two subscribing witnesses.

ALBERT SAUER.

Witnesses:
DANIEL KRAUSHAR,
BOLESDAW YARODESS.